(12) United States Patent
Imamura et al.

(10) Patent No.: US 8,783,226 B2
(45) Date of Patent: Jul. 22, 2014

(54) KNOCKING CONTROL SYSTEM FOR GAS ENGINE

(75) Inventors: Tsukasa Imamura, Kobe (JP); Tomohiko Sugimoto, Kobe (JP); Tetsuo Tokuoka, Kobe (JP); Hiroyoshi Ishii, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 547 days.

(21) Appl. No.: 13/122,138

(22) PCT Filed: Sep. 17, 2009

(86) PCT No.: PCT/JP2009/004686
§ 371 (c)(1),
(2), (4) Date: May 2, 2011

(87) PCT Pub. No.: WO2010/038373
PCT Pub. Date: Apr. 8, 2010

(65) Prior Publication Data
US 2011/0259298 A1 Oct. 27, 2011

(30) Foreign Application Priority Data
Oct. 1, 2008 (JP) .................................. 2008-256099

(51) Int. Cl.
 F02P 5/00 (2006.01)
 F02D 19/02 (2006.01)
 F02M 21/02 (2006.01)
 F02B 19/12 (2006.01)
 F02B 19/10 (2006.01)
 G01L 23/22 (2006.01)
 F02P 5/152 (2006.01)

(52) U.S. Cl.
 CPC ............ *F02B 19/108* (2013.01); *F02D 19/024* (2013.01); *F02M 21/0284* (2013.01); *Y02T 10/125* (2013.01); *F02B 19/12* (2013.01); *Y02T 10/32* (2013.01); *F02M 21/0275* (2013.01); *G01L 23/225* (2013.01); *F02P 5/152* (2013.01); *F02M 21/0278* (2013.01); *Y02T 10/46* (2013.01)

USPC ............ 123/406.38; 123/406.39; 123/406.21; 123/406.16; 73/35.03

(58) Field of Classification Search
 USPC ............. 123/406.16, 406.17, 406.21, 406.29, 123/406.38, 406.39; 73/35.03, 35.04, 35.06
 See application file for complete search history.

(56) References Cited

U.S. PATENT DOCUMENTS 4,699,106 A * 10/1987 Haraguchi et al. ....... 123/406.21
4,903,210 A    2/1990 Akasu
(Continued)

FOREIGN PATENT DOCUMENTS

JP      29224467 A    12/1984
JP      61-049169     3/1986
(Continued)

OTHER PUBLICATIONS

ISA Japanese Patent Office, International Search Report of PCT/JP2009/004686, Nov. 17, 2009, 2 pages.

*Primary Examiner* — Erick Solis
*Assistant Examiner* — Anthony L Bacon
(74) *Attorney, Agent, or Firm* — Alleman Hall McCoy Russell & Tuttle LLP

(57) ABSTRACT

A knocking control system for a gas engine of the present invention, being configured to calculate a knocking occurrence ratio (SEV) which is a ratio of a cycle number of cycles in which a predetermined knocking occurs for a period of the cycles of the predetermined cycle number, to the predetermined cycle number, decide a target value of an ignition timing of the ignition device based on a deviation ($\Delta$SEV) between an occurrence ratio delay calculation value ($SEV_{AVE}$) obtained by performing delay calculation of the knocking occurrence ratio and a predetermined occurrence ratio target value ($SEV_{SET}$), and drive the ignition device so that the ignition timing reaches a command value (IGN) decided according to the target value.

6 Claims, 3 Drawing Sheets

(56) References Cited

U.S. PATENT DOCUMENTS

| | | | |
|---|---|---|---|
| 5,598,822 A * | 2/1997 | Fujishita et al. | 123/406.38 |
| 6,561,163 B1 | 5/2003 | Takahashi et al. | |
| 7,712,450 B2 * | 5/2010 | Sato et al. | 123/406.11 |
| 8,327,826 B2 * | 12/2012 | Okoshi et al. | 123/406.23 |
| 2002/0092488 A1 | 7/2002 | Aoyama et al. | |
| 2004/0003805 A1 | 1/2004 | Ono et al. | |
| 2004/0182360 A1 | 9/2004 | Mashiki | |
| 2007/0016387 A1 * | 1/2007 | Takemura et al. | 702/185 |
| 2009/0276147 A1 * | 11/2009 | Hamama et al. | 701/111 |

FOREIGN PATENT DOCUMENTS

| | | |
|---|---|---|
| JP | 06-249116 | 9/1994 |
| JP | 07-063150 | 3/1995 |
| JP | 11-257198 | 9/1999 |
| JP | 2001-032744 A | 2/2001 |
| JP | 2002-070558 A | 3/2002 |
| JP | 2002-285876 A | 10/2002 |
| JP | 2003-148217 A | 5/2003 |
| JP | 2003-328840 A | 11/2003 |
| JP | 2004-278461 A | 10/2004 |
| JP | 2007-247569 A | 9/2007 |

* cited by examiner

KNOCKING CONTROL SYSTEM FOR GAS ENGINE

TECHNICAL FIELD

The present invention relates to a knocking control system for a reciprocating gas engine using as a main fuel a gas fuel such as a natural gas or a city gas.

BACKGROUND ART

It is known that a gas engine utilized in power generation equipment can attain a high power generation efficiency when its operation is continued under a situation in which knocking is not occurring but slight knocking might occur. On the other hand, since knocking with a high intensity causes damage to a cylinder, it is required that the knocking be prevented from occurring with greatest effort.

To this end, for example, Patent Literature 1 discloses a knocking control system for a gas engine for controlling occurrence of the knocking. This knocking control system is configured to change a fuel feed amount or an ignition timing of a corresponding cylinder to prevent occurrence of the knocking when a knocking occurrence ratio exceeds a predetermined threshold. This occurrence ratio is calculated at each passage of a predetermined number of cycles. A compensation value for changing the fuel feed amount or the ignition timing is decided at each passage of the predetermined number of cycles, according to a deviation between the occurrence ratio and a threshold. Especially when the knocking occurs frequently, the fuel feed amount is reduced to suppress occurrence of the knocking.

PRIOR ART LITERATURE

Patent Literature

Patent Literature 1: Japanese Laid-Open Patent Application Publication No. 2007-247569.

SUMMARY OF THE INVENTION

Technical Problem

However, when the gas engine is being operated under the above described situation for the purpose of attaining a high power generation efficiency, the occurrence ratio of the knocking is unstable. In accordance with the control system disclosed in the above Patent Literature 1, if the occurrence ratio of the knocking significantly changes at each passage of a predetermined number of cycles, the fuel feed amount and the ignition timing change significantly correspondingly to each passage of the predetermined number of cycles, and it is difficult to stabilize the operation of the engine. If a threshold is set larger to avoid this, a deviation between the occurrence ratio of the knocking and the threshold becomes small. As a consequence, occurrence of the knocking is underestimated and the knocking cannot be sufficiently suppressed. Furthermore, if the fuel feed amount is reduced to suppress the occurrence of the knocking, a desired engine driving power cannot be gained.

Accordingly, an object of the present invention is to suppress occurrence of the knocking sufficiently while maintaining a desired engine driving power without making an operation of the gas engine unstable.

Solution to Problem

The present invention has been made under the circumstances, and a knocking control system for a gas engine of the present invention comprises: an ignition device for igniting an air-fuel mixture supplied to the gas engine; a knocking detector for detecting a knocking in a cylinder of the gas engine; a phase angle detector for detecting a phase angle of the gas engine; and a controller for driving the ignition device, the controller being configured to calculate a knocking occurrence ratio that is defined as a value obtained by dividing a determined number of cycles in which knock was detected within a predetermined number of cycles by the predetermined number of cycles, decide a target value of an ignition timing of the ignition device based on a deviation between an occurrence ratio delay calculation value obtained by performing delay calculation of the knocking occurrence ratio and a predetermined occurrence ratio target value, and drive the ignition device so that the ignition timing reaches a command value decided according to the target value.

In such a configuration, the occurrence ratio delay calculation value is a value based on a history of past knocking occurrence ratios. For this reason, even if the knocking occurrence ratio changes significantly at each passage of the predetermined number of cycles, the ignition timing does not change significantly according to this change. Therefore, a stable operation of the gas engine can be ensured while suppressing occurrence of the knocking. Furthermore, the occurrence ratio of the knocking is controlled by changing the ignition timing, and a desired engine driving power can be maintained as compared to a case where a fuel feed amount is changed.

The controller may be configured to retard the ignition timing if the occurrence ratio delay calculation value is larger than the occurrence ratio target value and put the ignition timing advanced if the occurrence ratio delay calculation value is smaller than the occurrence ratio target value. In this case, it is preferable that a retard angle amount of the ignition timing per unit period in a case where the ignition timing is retarded is larger than an advancement angle amount of the ignition timing per unit period in a case where the ignition timing is put advanced. In such a configuration, the occurrence ratio of the knocking is reduced by retarding the ignition timing, in a quick manner. On the other hand, an output efficiency of the gas engine is increased by putting the ignition timing advanced, relatively slowly and safely. As a result, the knocking control is effectively performed while suppressing occurrence of the knocking quickly.

The controller may be configured to calculate a reference value of the ignition timing by performing a delay calculation of a command value of the ignition timing of the ignition device and decide the target value of the ignition timing of the ignition device by adding to the reference value a compensation value that is decided based on a deviation between the occurrence ratio delay calculation value and the occurrence ratio target value. In such a configuration, the ignition timing is a value derived by taking the past data into account as in the case of the knocking occurrence ratio, and the decided target value of the ignition timing is made stable. As used herein, the "compensation value" is meant to include a positive value and a negative value.

The knocking detector may detect knocking at one or more levels of intensity; and the controller may be configured to calculate a retard angle amount of the ignition timing of the ignition device according to a determined number of cycles in which knocking with a predetermined intensity or higher has occurred within a period of the predetermined number of cycles exceeds a threshold, and retard by the retard angle amount, the target value of the ignition timing of the ignition device which is calculated by adding to the reference value, the compensation value decided based on the deviation between the occurrence ratio delay calculation value and the occurrence ratio target value. In such a configuration, the ignition timing is retarded independently of the delay calculation. Therefore, if knocking with a predetermined intensity or higher, which imposes a substantial burden on the engine, has occurred, such knocking is suppressed and damage to the gas engine can be avoided.

The delay calculation may be moving average. The gas engine may include a main combustion chamber and a sub-combustion chamber which are supplied with the air-fuel mixture; and the ignition device may include an ignition plug for sparking and igniting the air-fuel mixture supplied to the sub-combustion chamber.

The above and further objects and features of the invention will be more fully apparent from the following detailed description of the preferred embodiment with accompanying drawings.

Advantageous Effect of the Invention

In accordance with the present invention, it is possible to suppress the knocking so that the knocking occurrence ratio gets close to a target occurrence ratio while maintaining a desired engine driving power without making an operation of the gas engine unstable.

DESCRIPTION OF EMBODIMENTS

Hereinafter, an embodiment of the present invention will be described with reference to drawings.

Figure 1:
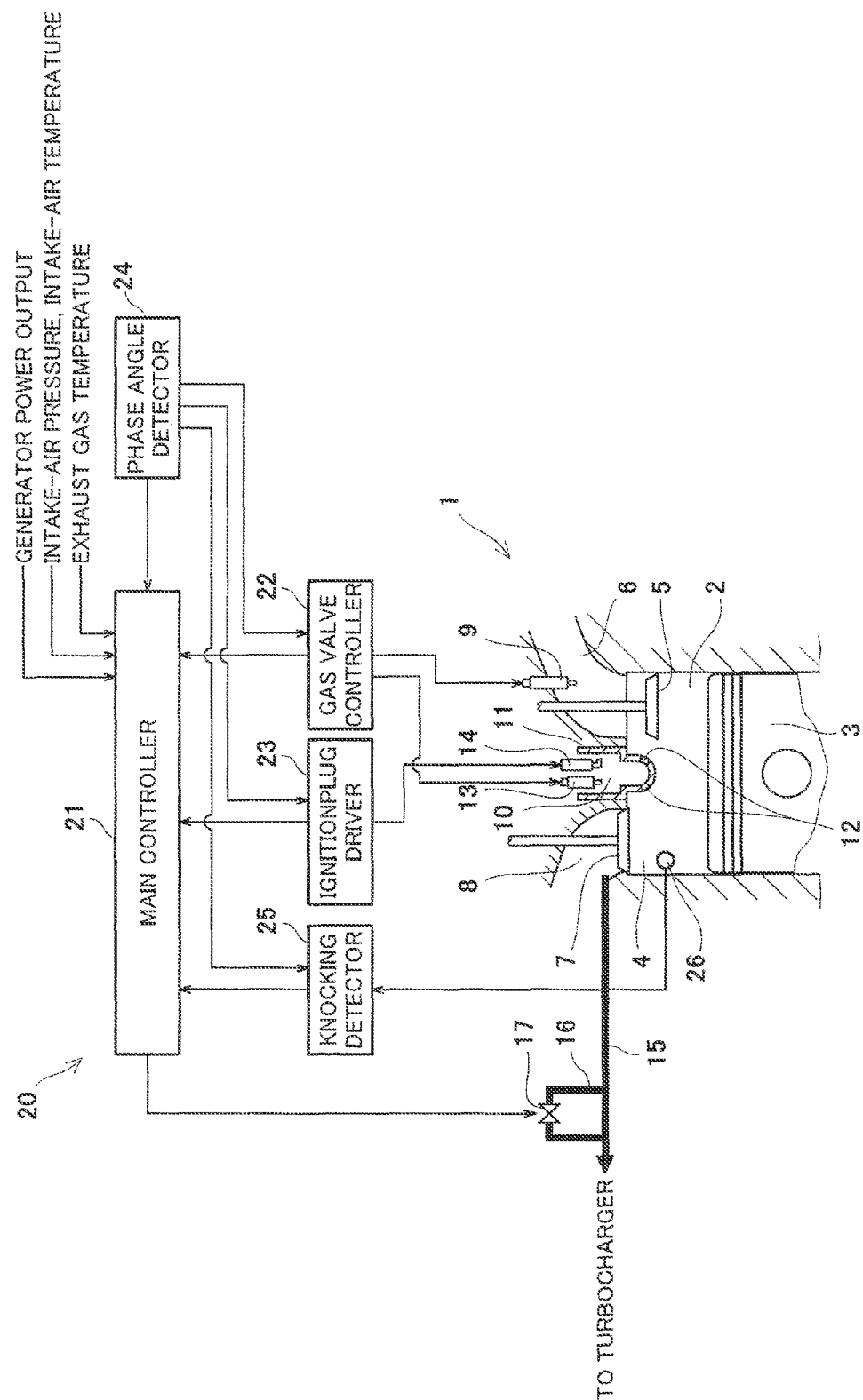
FIG. 1 is a view showing a configuration of a knocking control system for a gas engine according to the present invention.

FIG. 1 is a view showing a configuration of a knocking control system for a gas engine according to an embodiment of the present invention. As shown in FIG. 1, a gas engine 1 is a reciprocating multi-cylinder four-cycle engine which uses as a main fuel a gas fuel, such as a natural gas or a city gas, and is used as, for example, a prime mover of power generation equipment. In FIG. 1, a single cylinder 2 in the gas engine 1 is depicted as a representative cylinder, but other cylinders which are not shown have the same configuration.

A piston 3 is reciprocatably inserted into the cylinder 2. The piston 3 is coupled to a crankshaft (not shown) which is an output shaft of the gas engine 1. A main combustion chamber 4 is formed above the piston 3 inside the cylinder 2. An intake port 6 is coupled to the main combustion chamber 4 via intake valve(s) 5 and an exhaust port 8 is coupled to the main combustion chamber 4 via exhaust valve(s) 7. A main fuel feed valve 9 is provided inside the intake port 7 to inject the gas fuel.

A sub-combustion chamber 10 is adjacent to the main combustion chamber 4. The sub-combustion chamber 10 is separated from the main combustion chamber 4 by a separating wall 11, and connects with the main combustion chamber 4 through a connection hole 12 formed in the separating wall 11. In the sub-combustion chamber 10, a sub-fuel-feed valve 13 for injecting the gas fuel and an ignition plug 14 for combusting an air-fuel mixture are provided.

In accordance with the gas engine 1, in an intake stroke, an air-fuel mixture containing outside air and the gas fuel injected by the main fuel feed valve 9 is supplied to the main combustion chamber 4, via the intake port 6, while the air-fuel mixture containing the gas fuel injected by the sub-fuel-feed valve 13 is supplied to the sub-combustion chamber 10. In a compression stroke, the air-fuel mixture is compressed in the main combustion chamber 4 and in the sub-combustion chamber 10, and then the ignition plug 14 operates at a predetermined timing to ignite the air-fuel mixture in the sub-combustion chamber 10. A flame generated in the sub-combustion chamber 10 propagates to an interior of the main combustion chamber 4 through the connection hole 12, to ignite the air-fuel mixture in the interior of the main combustion chamber 4. Thereby, the piston 3 moves downward (expansion stroke). Then, in an exhaust stroke, a gas is exhausted from the main combustion chamber 4 to outside via the exhaust port 8.

An exhaust passage 15 is coupled to the exhaust port 8 and coupled to a turbocharger which is not shown. An exhaust bypass valve 17 is provided on a bypass passage 16 provided at the exhaust passage 15 to control an intake-air pressure. In the intake stroke, high-pressure air from the turbocharger which is not shown is supplied to the intake port 6.

The gas engine 1 operates in such a manner that it goes through the above four strokes as one cycle. During one cycle, the piston 3 reciprocates twice, the crankshaft 2 rotates twice and a camshaft (not shown) constituting a valve system for driving the intake valve(s) 5 and the exhaust valve(s) 7 rotates once. In other words, a position of the piston 3, a rotational angle (crank angle) of the crankshaft, a rotational angle of the camshaft, etc, during one cycle operation may be treated as a phase angle of the gas engine 1.

As shown in FIG. 1, a knocking control system 20 for the gas engine 1 according to an embodiment of the present invention includes a main controller 21 including a CPU, a memory, and an input/output interface. A control program for the knocking occurrence ratio control as described later, are stored in the memory and executed by the CPU.

The main controller 21 is coupled to a gas valve controller 22 for outputting drive signals to the main fuel feed valve 9 and to the sub-fuel-feed valve 13, which are electromagnetic valves, and outputs command signals to the gas valve controller 22 to drive the fuel feed valves 9 and 13. The main controller 21 is coupled to an ignition plug driver 23 for outputting a drive signal to the ignition plug 14. The main controller 21 outputs a command signal to the driver 23 to drive the driver 23 and the ignition plug 14, thereby controlling an ignition timing of the air-fuel mixture. The control for driving the ignition plug 14 is performed independently for each cylinder 2.

The knocking control system 20 includes a phase angle detector 24 for detecting a phase angle of the gas engine 1 to control operational periods of the fuel feed valves 9 and 13 and the ignition timing of the air-fuel mixture by the ignition plug 14. Signals from the phase angle detector 24 are input to the main controller 21, the gas valve controller 22 and the ignition plug driver 23. The phase angle detector 24 may be constituted by an electromagnetic pickup, a proximity switch or a rotary encoder.

The knocking control system 20 includes a knocking detector 25 for detecting occurrence of a knocking. The phase angle detector 24 and a cylinder internal pressure sensor 26 for detecting an internal pressure of the cylinder 2 are coupled to the knocking detector 25. The knocking detector 25 determines whether a combustion state in the cylinder 2 is "normal", "misfire", "light knocking", or "heavy knocking" in each cycle based on the phase angle of the gas engine 1 and a pressure fluctuation in the interior of the cylinder 2. The cylinder internal pressure sensor 26 is provided individually for each cylinder 2. The knocking detector 25 determines the combustion state of each cylinder 2 individually. The main controller 21 receives as an input a result of a determination made by the knocking detector 25.

Figure 2:
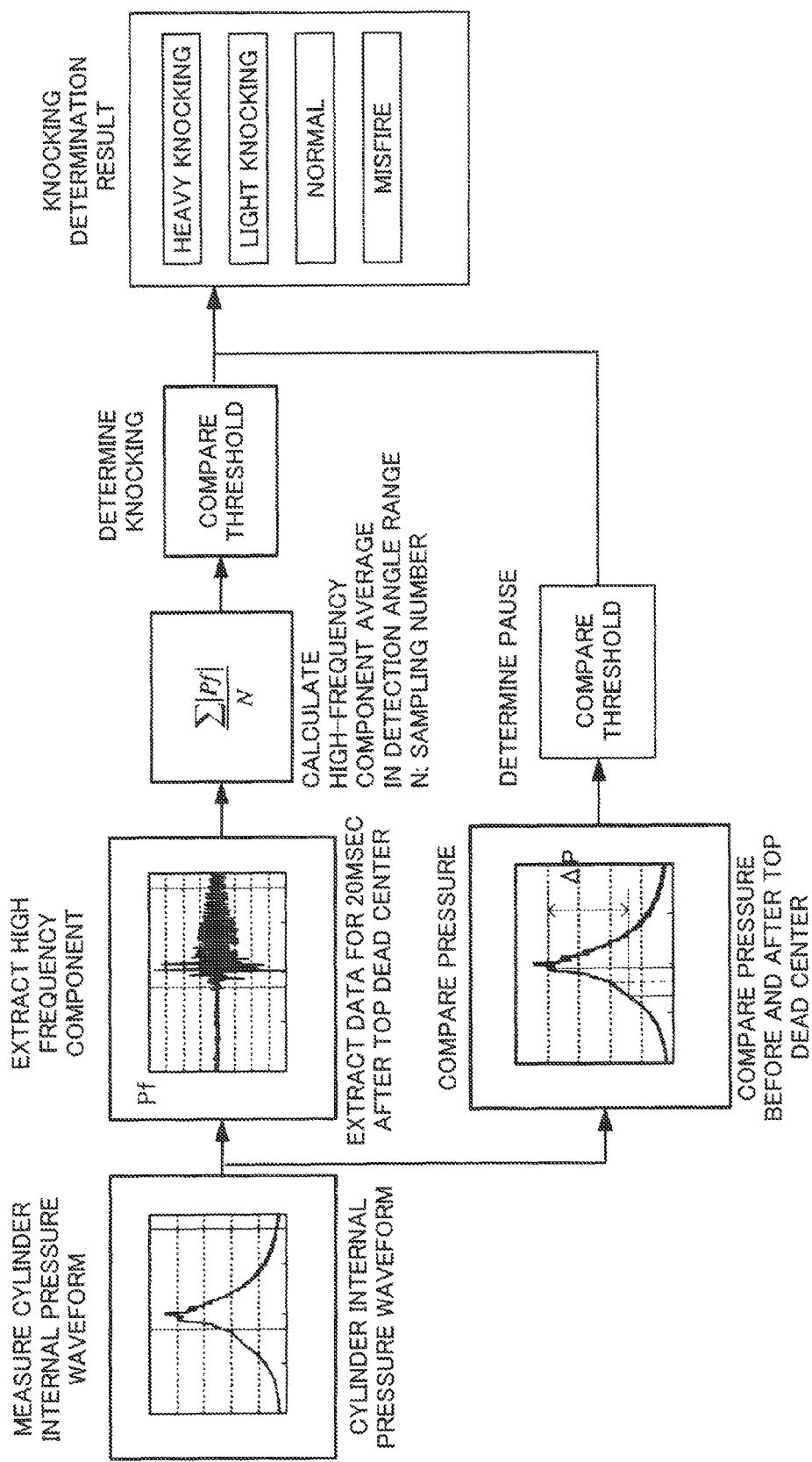
FIG. 2 is a view showing a combustion state determination process executed by a knocking detector of FIG. 1.

FIG. 2 is a view showing a combustion state determination process executed by the knocking detector 25. As shown in FIG. 2, when the cylinder internal pressure sensor measures a waveform of the cylinder internal pressure, the knocking detector filters this waveform to extract a high-frequency component. A range of data extraction is set to a predetermined time (e.g., 20 msec) after the piston reaches top dead center. The high-frequency component within this time is sampled in plural number (N). An average value of the sampled components is calculated. If this average value is not less than a first threshold, it is determined that the combustion state of the cylinder is "heavy knocking", while if this average value is less than the first threshold and not less than a second threshold, it is determined that the combustion state of the cylinder is "light knocking". Each of "heavy knocking" and "light knocking" indicates a state where the knocking is occurring in the cylinder based on a determination using the second threshold. "Heavy knocking" indicates a state where knocking with a predetermined intensity or higher based on the first threshold is occurring, while "light knocking" indicates a state where knocking with an intensity which is lower than the predetermined intensity based on the first threshold is occurring.

When the cylinder internal pressure sensor measures a waveform of the cylinder internal pressure, the knocking detector compares cylinder internal pressures before and after top dead center and determines whether or not a pressure deviation $\Delta P$ derived from the comparison exceeds a threshold. If the pressure deviation $\Delta P$ is less than the threshold, it is determined that the combustion state of the cylinder is "misfire", while if the pressure deviation $\Delta P$ is not less than the threshold and the above average value is less than the second threshold, it is determined that the combustion state of the cylinder is "normal".

Turning back to FIG. 1, the main controller 21 receives, as additional inputs, a generator power output, an intake-air pressure, an intake-air temperature, an exhaust gas temperature, etc. The main controller 21 controls an opening degree of the exhaust bypass valve 17 so that a predetermined intake-air pressure is attained with respect to the generator power output, thereby maintaining an air-fuel ratio of the air-fuel mixture at a predetermined value according to the generator power output. The main controller 21 controls the exhaust gas temperature of each cylinder 2 so that the exhaust gas temperatures of the respective cylinders 2 are made even, thereby equalizing loads placed on the respective cylinders 2. The gas valve controller 22 controls a gas fuel pressure so that a pressure difference between the intake-air pressure and the gas fuel pressure reaches a predetermined value to enable the main fuel feed valve 9 which is the electromagnetic valve to open and close stably regardless of a magnitude of the intake-air pressure.

Figure 3:
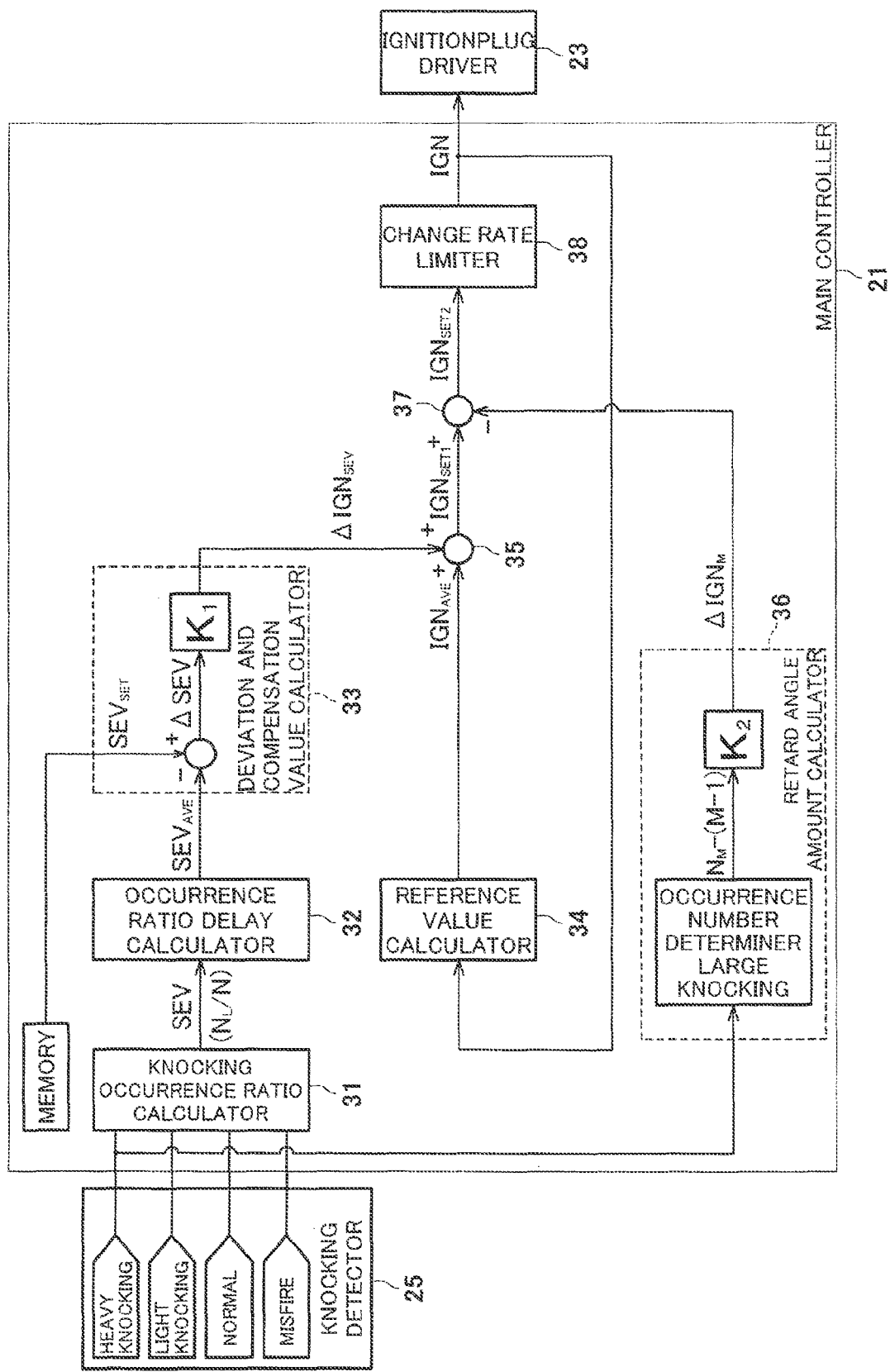
FIG. 3 is a view showing a knocking occurrence ratio control executed by a main controller of FIG. 1.

Hereinafter, with reference to FIG. 1 and based on FIG. 3, the knocking occurrence ratio control executed by the main controller 21 of the knocking control system 20 will be described.

The knocking occurrence ratio control is directed to making a knocking occurrence ratio SEV of each cylinder 2 close to a predetermined target value $SEV_{SET}$. An outline of this control is such that a target value $IGN_{SET2}$ of the ignition timing of the air-fuel mixture in each cylinder 2 is updated every time the gas engine 1 goes through a predetermined number of cycles N (e.g., 50 cycles) and a command value IGN, decided based on the target value $IGN_{SET2}$, is output to the ignition plug driver 23 to drive the ignition plug 14. As known, if the ignition timing is retarded, the knocking is less likely to occur, while if the ignition timing is put advanced, the knocking is more likely to occur.

In accordance with this control content, the main controller 21 includes as functional blocks, a knocking occurrence ratio calculator 31, an occurrence ratio delay calculator 32, a deviation and compensation value calculator 33, a reference value calculator 34, a primary target value calculator 35, a retard angle amount calculator 36, a secondary target value calculator 37, and a change rate limiter 38.

A content of the knocking occurrence ratio control will be described specifically. As shown in FIG. 3, the main controller 21 receives as an input a combustion state of the cylinder 2 which is determined by the knocking detector 25 in each cycle. When it is determined that the gas engine 1 has gone through the cycles of the predetermined cycle number N, based on a signal received from the phase angle detector 24, the knocking occurrence ratio calculator 31 in the main controller 21 calculates a ratio SEV of a cycle number $N_L$ of cycles in which the light knocking has occurred for the cycles of the predetermined cycle number N to the predetermined cycle number N ($SEV=N_L/N$). Hereinafter, this ratio SEV will be referred to "knocking occurrence ratio".

The occurrence ratio delay calculator 32 in the main controller 21 performs a delay calculation of the knocking occurrence ratio SEV which is a predetermined period back (designated by reference symbol T for the sake of convenience) from a most recent knocking occurrence ratio. As a method of the delay calculation, in this embodiment, a moving average is used. The occurrence ratio delay calculator 32 calculates an occurrence ratio average value $SEV_{AVE}$. It should be noted that the moving average may be a simple moving average or a weighted moving average in which weighting with respect to a knocking occurrence ratio at a time which is close to a present time is higher. Or, a calculation method of the delay calculation may be a primary delay calculation.

A period of time (e.g., several minutes) which is sufficiently longer with respect to the predetermined number of cycles N ensured to obtain the knocking occurrence ratio SEV, is set as the predetermined period T which is a calculation range of the delay calculation. Therefore, past knocking occurrence ratios within a period of time which is at least the predetermined period T back from the most recent knocking occurrence ratio are stored in a memory of the main controller 21.

A target value $SEV_{SET}$ of the knocking occurrence ratio is prestored in the memory of the main controller 21. When the gas engine 1 continues to be operated under a state where the knocking occurrence ratio is the occurrence ratio target value $SEV_{SET}$, a high power generation efficiency is achieved and the gas engine 1 is not substantially damaged. The occurrence ratio target value $SEV_{SET}$ is a value derived from an experiment or a numeric value simulation.

The deviation and compensation value calculator 33 in the main controller 21 compares the occurrence ratio average value $SEV_{AVE}$ to the occurrence ratio target value $SEV_{SET}$ to calculate a deviation $\Delta SEV$. Here it is supposed that the occurrence ratio target value $SEV_{SET}$ is a positive value and the occurrence ratio average value $SEV_{AVE}$ is a negative value ($\Delta SEV=SEV_{SET}-SEV_{AVE}$) for calculation of the deviation $\Delta SEV$. Further, the deviation and compensation value calculator 33 multiplies the deviation $\Delta SEV$ by a gain $K_1$ to calculate a compensation value $\Delta IGN_{SEV}$ ($\Delta IGN_{SEV}=\Delta SEV \times K_1$). If the deviation $\Delta SEV$ is a positive value, i.e., the knocking occurrence ratio is lower than the target value, the compensation value $\Delta IGN_{SEV}$ is a positive value. If not, the compensation value $\Delta IGN_{SEV}$ is a negative value.

The primary target value calculator 35 in the main controller 21 adds the compensation value $\Delta IGN_{SEV}$ to a reference value $IGN_{AVE}$ calculated in the reference value calculator 34 to calculate a primary target value $IGN_{SET1}$ of ignition timing ($IGN_{SET1}=IGN_{AVE}+\Delta IGN_{SEV}$). If the compensation value $\Delta IGN_{SEV}$ is a positive value, the primary target value $IGN_{SET1}$ is a value obtained by advancing the reference value $IGN_{AVE}$ by the compensation value $\Delta IGN_{SEV}$, while if the compensation value $\Delta IGN_{SEV}$ is a negative value, the primary target value $IGN_{SET1}$ is a value obtained by retarding the reference value $IGN_{AVE}$ by the compensation value $\Delta IGN_{SEV}$.

The reference value calculator 34 in the main controller 21 performs a delay calculation of a command value IGN (substantially equal to an actual ignition timing) of the ignition timing to calculate the reference value $IGN_{AVE}$. For the delay calculation, the same calculation method as that for calculating the occurrence ratio average value $SEV_{AVE}$ is preferably used. In this embodiment, the reference value $IGN_{AVE}$ is calculated by calculating a moving average of past command values IGN within the predetermined period T back from a most recent command value. When the occurrence ratio average value $SEV_{AVE}$ is calculated by the weighed moving average, similar weighting is considered in calculation of the reference value $IGN_{AVE}$.

The secondary target value calculator 37 in the main controller 21 subtracts the retard angle amount $\Delta IGN_M$ calculated in the retard angle amount calculator 36 from the primary target value $IGN_{SET1}$ to calculate a secondary target value $IGN_{SET2}$ of the ignition timing ($IGN_{SET2}=IGN_{SET1}-\Delta IGN_M$, $\Delta IGN_M \geq 0$).

A number of cycles $N_M$ in which heavy knocking occurred within the predetermined number of cycles N is stored in the main controller 21 to calculate the retard angle amount $\Delta IGN_M$. If the number of cycles $N_M$ is not less than a predetermined threshold M, the retard angle amount calculator 36 in the main controller 21 calculates the retard angle amount $\Delta IGN_M$ according to the number of cycles $N_M$. To be specific, the retard angle amount calculator 36 subtracts, from the number of cycles $N_M$, a value obtained by subtracting 1 from the threshold M, and multiplies the resulting value by a gain $K_2$ to calculate the retard angle amount ($\Delta IGN_M=\{N_M-(M-1)\}\times K_2$). It should be noted that if the number of cycles $N_M$ is less than the threshold M, a value obtained from a formula: $N_M-(M-1)$ is treated as zero. Therefore, when the number of cycles $N_M$ is not less than the threshold, the retard angle amount $\Delta IGN_M$ increases as the number of cycles $N_M$ increases, while when the number of cycles $N_M$ is less than the threshold M, the retard angle amount $\Delta IGN_M$ becomes zero. The threshold M is set to a suitable value according to a specification of the gas engine 1 (e.g., M=2).

The main controller 21 updates the secondary target value $IGN_{SET2}$ considering the retard angle amount $\Delta IGN_M$ as a final target value of the ignition timing. The main controller 21 is configured to prevent the command value IGN of the ignition timing from promptly changing from a current command value (substantially equal to a secondary target value just before an update) to the secondary target value $IGN_{SET2}$ updated in a present case.

To be specific, the change rate limiter 38 in the main controller 21 limits an advancement angle amount of the ignition timing per unit period to a first change rate (in this description, expressed as reference symbol $\Delta IGN_{LIM1}$ for the sake of convenience) when secondary target value $IGN_{SET2}$ updated in a present case is larger than the current command value, and the command value of the ignition timing is required to be put advanced. Although the "unit period" is the time to complete one cycle in this embodiment to simplify the explanation, a unit time may be used.

In this case, during a period from when the secondary target value $IGN_{SET2}$ is updated until the command value of the ignition timing reaches the updated secondary target value $IGN_{SET2}$, at least a number of cycles corresponding to an integer part obtained by dividing the secondary target value $IGN_{SET2}$ by the first change rate $\Delta IGN_{LIM1}$ is required to pass, and the ignition timing is put advanced by a remainder resulting from the division, in a next cycle after the number of cycles pass, if the remainder results as a result of the division. In other words, assuming that a difference between the updated secondary target value $IGN_{SET2}$ and the command value just before the update is sufficiently larger with respect to the first change rate $\Delta IGN_{LIM1}$ and when the number of cycles which have passed after updating the secondary target value $IGN_{SET2}$ is n, the command value IGN of the ignition timing after the passage of the number of cycles n becomes a value which is obtained by putting the command value (IGN') just before the update, advanced by n×first change rate $\Delta IGN_{LIM1}$ (IGN=IGN'+$IGN_{LIM1} \times n$). Since the change rate limiter 38 in the main controller 21 decides the command value IGN in the above described manner, it is possible to avoid the ignition timing from being changed suddenly and to thereby avoid a behavior of the gas engine 2 from getting unstable.

On the other hand, in a case where the command value of the ignition timing is required to be retarded, the retard angle amount of the ignition timing per unit period is limited to a second change rate (in this description, expressed as reference symbol $\Delta IGN_{LIM2}$ for the sake of convenience). Therefore, when the ignition timing is retarded, a number of cycles derived as in the case of putting the ignition timing advanced, is required to pass, within a period before the command value IGN of the ignition timing reaches the secondary target value $IGN_{SET2}$.

An absolute value of the second change rate $\Delta IGN_{LIM2}$ is set to a value larger than an absolute value of the first change rate $\Delta IGN_{LIM1}$ ($|\Delta IGN_{LIM2}|>|\Delta IGN_{LIM1}|$). In other words, in the case where the command value IGN of the ignition timing is retarded, a period taken for the command value IGN of the ignition timing to reach the secondary target value $IGN_{SET2}$ is shorter when the command value IGN of the ignition timing is retarded than when the command value IGN of the ignition timing is put advanced. In this way, the gas engine 1 is relatively quickly placed into a state where the knocking is less likely to occur, thereby reducing a likelihood that the gas engine 1 will get damaged because of the knocking. On the other hand, when an output efficiency of the gas engine 1 is increased by putting the command value IGN of the ignition timing advanced, the output efficiency is implemented relatively slowly and stably. As a result, the knocking control is effectively performed while suppressing occurrence of the knocking quickly.

In the manner as described above, the main controller 21 decides the command value IGN of the ignition timing according to the updated secondary target value $IGN_{SET2}$, the command value of the ignition timing just before the update, the first change rate $\Delta IGN_{LIM1}$ or the second change rate $\Delta IGN_{LIM2}$. The main controller 21 outputs a control signal to the ignition plug driver 23 based on the command value IGN and a signal received from the phase angle detector 24. Thus, the air-fuel mixture in the sub-combustion chamber 10 is ignited at an ignition timing according to the command value IGN.

Once the secondary target value $IGN_{SET2}$ is updated, the main controller 21 decides the command value IGN of the ignition timing based on the updated secondary target value $IGN_{SET2}$ and drives the ignition plug 14, during a period of time until the predetermined number of cycles N pass. After a passage of the predetermined number of cycles N, the secondary target value $IGN_{SET2}$ is updated again, according to the above procedure.

In the knocking control system 20, the target value of the ignition timing is calculated based on the deviation $\Delta SEV$ between the occurrence ratio average value $SEV_{AVE}$ and the occurrence ratio target value $SEV_{SET}$, as represented by the functional blocks 31-33 and 35. Since the target value of the ignition timing is calculated from a history of the knocking occurrence ratios considering the past knocking occurrence ratios as described above, it is possible to avoid the target value of the ignition timing from changing significantly according to a significant change in a most recent knocking occurrence ratio even if the most recent knocking occurrence ratio changes significantly with respect to the past knocking occurrence ratios. This makes it possible to make the knocking occurrence ratio SEV of the gas engine 1 closer to the occurrence ratio target value $SEV_{SET}$ without causing an unstable operation of the gas engine 1. Furthermore, since the control of the knocking occurrence ratio SEV is performed by changing the ignition timing, a desired engine driving power can be maintained without changing the engine driving power significantly as compared to a case where a fuel feed amount is changed.

As indicated by the function block 34, the reference value $IGN_{AVE}$ used for changing the target value of the ignition timing is also calculated by performing the delay calculation of the command value IGN. Since the reference value $IGN_{AVE}$ is calculated considering the past command values IGN, the target value of the ignition timing calculated based on the reference value $IGN_{AVE}$ does not change significantly. As a result, the operation of the gas engine 1 is further stabilized.

As indicated by the functional blocks 36 and 37, in a case where a number of cycles $N_M$ in which the heavy knocking imposing a large burden on the gas engine 1 occurs, is not less than the predetermined threshold M, the target value of the ignition timing is retarded according to the number of cycles $N_M$. Thus, occurrence of the heavy knocking can be prevented and the gas engine 1 can be protected.

As indicated by the functional blocks 35 and 37, the retard angle amount $\Delta IGN_M$ is used as a value for changing the primary target value $IGN_{SET1}$ calculated based on the deviation $\Delta SEV$ between the occurrence ratio average value $SEV_{AVE}$ and the occurrence ratio target value $SEV_{SET}$, and the secondary target value $IGN_{SET2}$ calculated based on the primary target value $IGN_{SET1}$, and the retard angle amount $\Delta IGN_M$ is a final target value of the ignition timing. Thus, the retard angle amount $\Delta IGN_M$ decided according to the number of cycles $N_M$ in which the heavy knocking has occurred is directly used for calculating the final target value of the ignition timing without the delay calculation. For this reason, the final target value of the ignition timing and the command value of the ignition timing decided based on the final target value are values which reflect the retard angle amount $\Delta IGN_M$ to a great extent. Therefore, in a situation where occurrence of the heavy knocking exceeds an allowable range, occurrence of the heavy knocking can be suppressed promptly to address such a situation.

Thus far, the embodiment of the knocking control system 20 for the gas engine 1 of the present invention has been described. The above explained configuration can be changed suitably without departing from the scope of the invention.

For example, although the moving average is used as the calculation method of the delay calculation considering the past knocking occurrence ratios, a primary delay calculation may alternatively be used, for example. If the calculation method is changed, a calculation means for calculating the reference value of the ignition timing in the functional block 34 is preferably changed correspondingly.

Although the knocking occurrence ratio SEV is a ratio defined as a value obtained by dividing the determined number of cycles $N_L$ in which the light knocking has occurred within the predetermined number of cycles N by the predetermined number of cycles N ($SEV = N_L/N$), it may be a ratio defined as a value obtained by dividing a number of cycles in which the light knocking and heavy knocking have occurred within the predetermined number of cycles N by the predetermined number of cycles N ($SEV = (N_L + N_M)/N$).

Although in this embodiment, a so-called sub-combustion chamber and spark ignition method in which the ignition plug 14 ignites the air-fuel mixture in the sub-combustion chamber 10 is used as a method for igniting the air-fuel mixture, another method may be used. For example, a so-called pilot fuel injection method may be used, in which a gas engine is provided with a pilot fuel injection valve for injecting a high-pressure gas fuel and a high-pressure gas fuel is injected by the pilot fuel injection valve to a compressed air-fuel mixture in the combustion chamber.

The use of the gas engine 1 is not limited to the prime mover in the power generation equipment but may be prime movers in other facilities or apparatuses.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention has remarkable advantages that a knocking occurrence ratio can be made closer to a target value while maintaining a desired engine driving power and maintaining a stable operation of the gas engine with a greatest effort and is particularly suitably applied to a gas engine used as a prime mover in a power generation equipment.

REFERENCE CITATION LIST 1 gas engine
2 cylinder
4 main combustion chamber
10 sub-combustion chamber
14 ignition plug
20 knocking control system
21 main controller
24 phase angle detector
25 knocking detector
31 knocking occurrence ratio calculator
32 occurrence ratio delay calculator
33 deviation and compensation value calculator
34 reference value calculator
35 primary target value calculator 36 retard angle amount calculator
37 secondary target value calculator
38 change rate limiter
SEV knocking occurrence ratio
$SEV_{AVE}$ occurrence ratio average value
$SEV_{SET}$ occurrence ratio target value
ΔSEV deviation
$IGN_{AVE}$ reference value
$ΔIGN_{SEV}$ compensation value
$IGN_{SET1}$ primary target value
$IGN_{SET2}$ secondary target value
IGN command value

The invention claimed is:

1. A knocking control system for a gas engine comprising:
an ignition device for igniting an air-fuel mixture supplied to the gas engine;
a knocking detector for detecting a knocking in a cylinder of the gas engine;
a phase angle detector for detecting a phase angle of the gas engine; and
a controller for driving the ignition device, the controller being configured to calculate a knocking occurrence ratio defined as a value obtained by dividing a determined number of cycles in which knocking occurs within a predetermined number of cycles by the predetermined number of cycles, perform a delay calculation of the knocking occurrence ratio to calculate an occurrence ratio delay calculation value, calculate a deviation between the occurrence ratio delay calculation value and a predetermined occurrence ratio target value, and drive the ignition device so that the ignition timing reaches a command value decided according to a target value of the ignition timing of the ignition device, by retarding the target value of the ignition timing of the ignition device based on the deviation if the occurrence ratio delay calculation value is larger than the occurrence ratio target value, and by advancing the target value of the ignition timing of the ignition device based on the deviation if the occurrence ratio delay calculation value is smaller than the occurrence ratio target value.

2. The knocking control system for the gas engine according to claim 1,
wherein the delay calculation is a moving average.

3. The knocking control system for the gas engine according to claim 1,
wherein a retard angle amount of the ignition timing per unit period in a case where the ignition timing is retarded is larger than an advancement amount of the ignition timing per unit period in a case where the ignition timing is put advanced.

4. The knocking control system for the gas engine according to claim 1,
wherein the controller is configured to calculate a reference value of the ignition timing by performing the delay calculation of a command value of the ignition timing of the ignition device and decide the target value of the ignition timing of the ignition device by adding to the reference value a compensation value decided based on a deviation between the occurrence ratio delay calculation value and the occurrence ratio target value.

5. The knocking control system for the gas engine according to claim 4,
wherein the knocking detector detects knocking with an intensity at one of a plurality of levels; and
the controller, when, during the passage of said predetermined number of cycles a determined number of cycles in which knocking with a predetermined intensity or higher has occurred exceeds a threshold, is configured to calculate a retard angle amount of the ignition timing of the ignition device, which is decided based on the determined number of cycles, and retard by the retard angle amount, the target value of the ignition timing decided based on the deviation between the occurrence ratio delay calculation value and the occurrence ratio target value.

6. The knocking control system for the gas engine according to claim 1,
wherein the gas engine includes a main combustion chamber and a sub-combustion chamber which are supplied with the air-fuel mixture; and
the ignition device includes an ignition plug for sparking and igniting the air-fuel mixture supplied to the sub-combustion chamber.

* * * * *